United States Patent [19]
Ogihara et al.

[11] Patent Number: 6,117,410
[45] Date of Patent: Sep. 12, 2000

[54] PROCESS FOR PRODUCING LITHIATED MANGANESE OXIDES BY A QUENCHING METHOD

[75] Inventors: Takashi Ogihara, Fukui; Hiroyuki Takahashi, Tokyo; Masahiro Ohmori; Katsutoshi Tamura, both of Chiba, all of Japan

[73] Assignee: Showa Denko Kabushiki Kaisha, Tokyo, Japan

[21] Appl. No.: 09/086,415

[22] Filed: May 29, 1998

Related U.S. Application Data

[60] Provisional application No. 60/083,104, Apr. 28, 1998.

[30] Foreign Application Priority Data

May 29, 1997 [JP] Japan .................................. 9-139795

[51] Int. Cl.$^7$ ................................................... C01G 45/12
[52] U.S. Cl. ............................................................ 423/599
[58] Field of Search ............................. 423/599; 429/224, 429/231.1

[56] References Cited

U.S. PATENT DOCUMENTS

| | | | |
|---|---|---|---|
| 4,980,251 | 12/1990 | Thackeray et al. | 423/599 |
| 5,425,932 | 6/1995 | Tarascon | 423/599 |
| 5,789,115 | 8/1998 | Manev et al. | 423/599 |
| 5,874,058 | 2/1999 | Sheargold et al. | 423/599 |
| 5,882,218 | 3/1999 | Reimers | 429/224 |

*Primary Examiner*—Steven Bos
*Attorney, Agent, or Firm*—Sughrue, Mion, Zinn, Macpeak & Seas, PLLC

[57] ABSTRACT

A process for producing lithiated manganese oxide having a layered rock-salt structure, which comprises burning lithium and manganese materials or pretreated materials thereof at a temperature needed to synthesize $LiMnO_2$, and then quenching the burnt materials.

16 Claims, 8 Drawing Sheets

DTA-TG CURVE OF PRECURSOR MATERIALS

POWDER X-RAY DIFFRACTION PATTERNS OF $LiMn_2O_4$

DISCHARGE CURVE OF $LiMnO_2$

DISCHARGE CURVE OF $LiMn_2O_4$

PROCESS FOR PRODUCING LITHIATED MANGANESE OXIDES BY A QUENCHING METHOD

CROSS REFERENCE TO RELATED APPLICATIONS

This application is an application filed under 35 U.S.C. §111(a) claiming benefit pursuant to 35 U.S.C. §119(e) (1) of the filing date of the Provisional Application 60/083,104 filed Apr. 28, 1998 pursuant to 35 U.S.C. §111(b).

FIELD OF THE INVENTION

The present invention relates to a process for producing lithiated (or lithium) manganese oxides by burning lithium and manganese materials. More particularly, the present invention relates to a process for producing a lithiated manganese oxide containing a layered rock-salt structure compound using a quenching method.

BACKGROUND OF THE INVENTION

Lithium secondary batteries using a compound represented by $LiCoO_2$ containing a transition metal and lithium as a cathode have been proposed as power sources for various electronic instruments. This is because of their high working potential of from 3 to 4 V and high energy density as compared with conventional nickel-cadmium batteries or nickel-hydrogen batteries. In particular, accompanying the abrupt growth of portable electronics, (e.g., portable phones, note-type personal computers) there is a keen demand for rechargeable compact lithium secondary batteries which can be used to power these instruments. Furthermore, taking into account the present demand for electric power, it is forecast that an electric power storing apparatus for domestic use will be indispensable in the future. Furthermore, the lithium secondary battery is expected to be a candidate therefor.

A lithium secondary battery can have elevated electromotive force, energy density and reversibility, as compared with conventional secondary batteries, by using lithium as a guest in the insertion reaction. This is because lithium has the highest charge density and lowest redox potential among solids. However, for use in practical applications, problems such as elongation of life and fabrication of a combined battery must be solved, and a key therefor is the development of a cathode material having higher capabilities.

Among cathode materials, lithiated manganese oxides provide a higher battery voltage than commercially available $LiCoO_2$ and in turn, high energy density. Moreover, manganese is more abundant than cobalt and is inexpensive. Accordingly, lithiated manganese oxides are the most promising cathode electroactive materials for the next generation of lithium batteries.

Several kinds of lithiated manganese oxides have been reported, however, only a spinel structure compound ($LiMn_2O_4$) is used at present as the cathode material for lithium secondary batteries. $LiMn_2O_4$ is drawing attention as a substitute material for $LiCoO_2$ because it is inexpensive, however, this compound has a theoretical capacity of 148 mAh/g which is far smaller than the theoretical capacity of $LiCoO_2$.

On the other hand, $LiMnO_2$ has a layered rock-salt structure which is the same as that of $LiCoO_2$, and has an electric capacity (284 mAh/g) almost equal to that of $LiCoO_2$. Therefore, $LiMnO_2$ is a promising substitute material. However, this compound is very difficult to synthesize by a typically used solid phase reaction method, and pure $LiMnO_2$ can only be obtained by a molten salt method or under controlled conditions in argon. The reason therefor is that because $LiMnO_2$ is present in the boundary region between a layered rock-salt structure and an irregularly arrayed rock-salt structure, a layered rock-salt structure in a semi-stable phase can be difficult to obtain.

SUMMARY OF THE INVENTION

It is therefore an object of the present invention to provide a process for efficiently producing lithiated manganese oxide containing a layered rock-salt structure compound in a semi-stable phase by burning in air using simple operations.

The above object of the present invention has been achieved by providing a process for producing lithiated manganese oxide by the quenching methods described below.

(1) A process for producing lithiated manganese oxide, which comprises burning lithium and manganese materials or pretreated materials thereof at a temperature needed to synthesize $LiMnO_2$, and then quenching the burnt materials.

(2) The process as described in (1) above, wherein the lithiated manganese oxide contains a layered rock-salt structure $LiMnO_2$ compound.

(3) The process as described in (1) or (2) above, wherein the pretreated material comprises a heat-treated material prepared by a solid phase reaction method or comprises a precursor prepared by a complex polymerization method.

(4) The process as described in any one of (1) to (3) above, which comprises quenching in liquid nitrogen.

DESCRIPTION OF THE PREFERRED EMBODIMENTS

Figure 1:
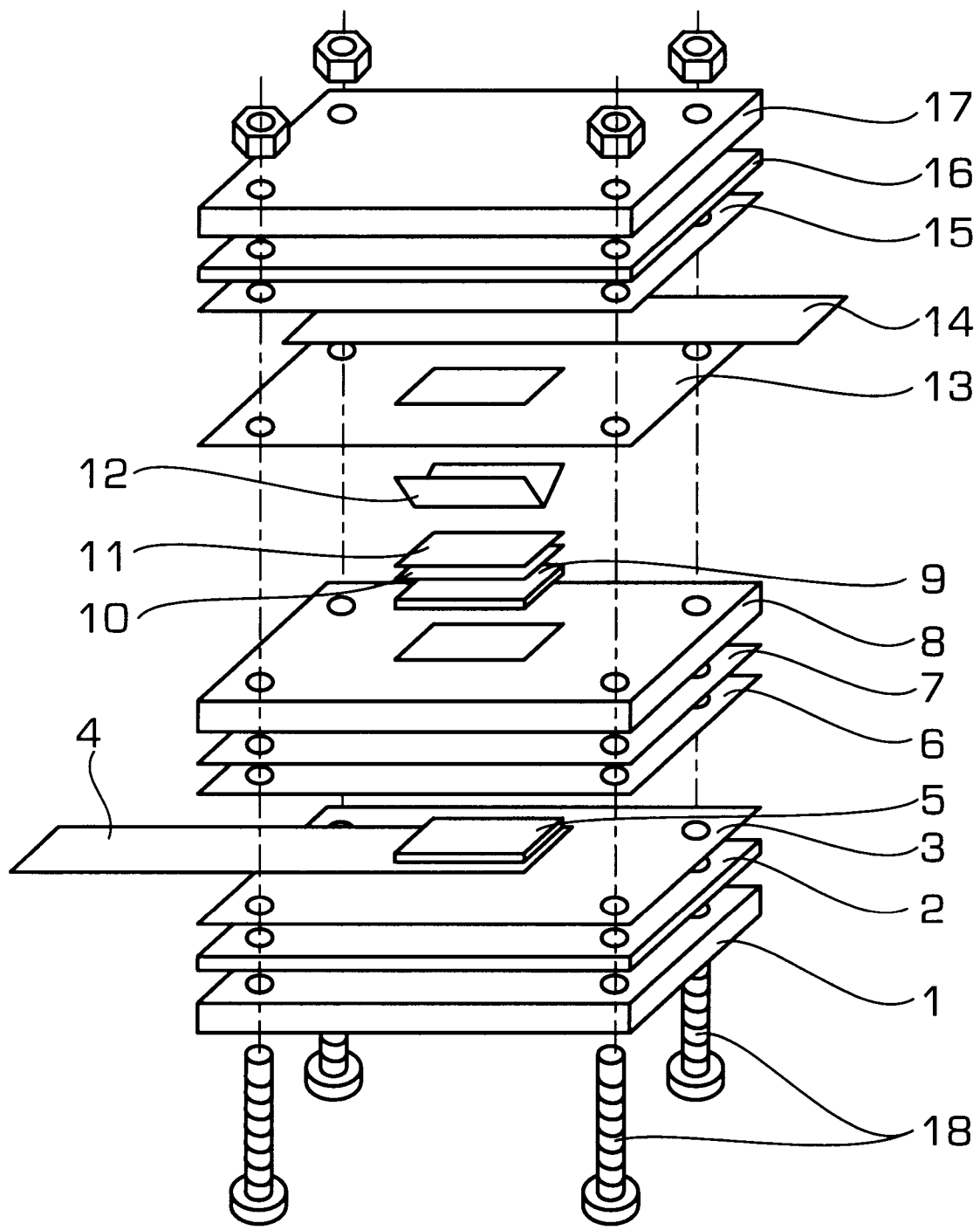
FIG. 1 is a structural view of the secondary battery used for carrying out the charging and discharging tests in the Examples.

The lithiated manganese oxide produced by the present invention is a lithiated manganese oxide containing $LiMnO_2$ which is a layered rock-salt structure compound. The lithiated manganese oxide may contain other oxides such as a spinel structure compound $LiMn_2O_4$ in addition to the layered rock-salt structure compound $LiMnO_2$.

In general, lithiated manganese oxides which can be used as a battery material include a layered rock-salt structure ($LiMnO_2$) compound and a spinel structure ($LiMn_2O_4$) compound. Of these, the spinel structure $LiMn_2O_4$ compound has a low theoretical capacity of 148 mAh/g, but can be easily synthesized by a typical solid phase reaction method.

On the other hand, when a layered rock-salt structure $LiMnO_2$ compound is used as the cathode, the theoretical capacity is as high as 284 mAh/g. However, this compound is difficult to synthesize by a solid reaction method. Furthermore, because $LiMnO_2$ is present in the boundary region between the layered rock-salt structure and the irregularly arrayed rock-salt structure, a layered rock-salt structure in a semi-stable phase can be difficult to obtain by a solid reaction method. According to the production process of the present invention, however, this compound can be easily produced.

The lithium and manganese materials for use in the present invention are selected such that the objective lithiated manganese oxide can be finally formed by burning, and examples thereof include an oxide, a hydroxide, an acetate, a carbonate and a sulfate of lithium or manganese. A manganate of lithium may also be used. The lithium and manganese materials may be selected therefrom without particular limitation according to the production process.

The ratio of the lithium and manganese materials for use in the process of the present invention is a reaction equivalent ratio corresponding to the compositional ratio of the lithiated manganese oxide as the final product. More specifically, in the case of $LiMnO_2$, the ratio of Li:Mn (atomic ratio)=1:1 is adjusted as the reaction equivalent. However, one part may be used in excess, and in that case, the ratio of Li:Mn (atomic ratio) is suitably from 1:0.5–1.5, preferably 1:0.8–1.2.

The lithium and manganese materials may be mixed in the form of a powder, slurry or solution and burned as such to form a lithiated manganese oxide. However, the lithiated manganese oxide is preferably produced by burning pre-treated materials obtained by a solid phase reaction method or a complex polymerization method.

The solid phase reaction method is a method of reacting a mixture of lithium and manganese materials in the solid phase by heat treating to produce a pretreated material, and then burning the pretreated material to produce a layered rock-salt structure $LiMnO_2$ compound. The materials for use in the solid phase reaction method are most preferably lithium carbonate and manganese carbonate, however, lithium nitrate, lithium hydroxide, manganese nitrate or other materials may also be used.

In the solid phase reaction method, the materials are pulverized into fine particles using a ball mill or the like, mixed and heat-treated to react in a heating apparatus such as an electric furnace. The heat treating as a pretreatment is preferably carried out at a temperature of from 600 to 850° C., more preferably from 700 to 800° C., for from 1 to 10 hours, more preferably from 2 to 5 hours. The thus-obtained pretreated material (heat-treated material) is pulverized, formed into pellets and burned.

The complex polymerization method is a method of reacting lithium and manganese materials, a complex forming agent and a solvent to effect complex polymerization and thereby produce a precursor as a preformed material, and then burning the pretreated material to produce a layered rock-salt structure $LiMnO_2$ compound.

The complex polymerization method has been recently developed for the purpose of precisely controlling the composition of a ceramic precursor at the molecular or atomic level. This method is hitherto applied to the synthesis method of a dielectric material such as a yttrium-base or bismuth-base oxide superconductor or barium titanate, in the production of ceramic powder.

According to this method, unlike a conventional sol-gel method, a plurality of ions such as rare earth elements and metal elements are uniformly dispersed in a polymer gel, and the complex incorporates ceramic constituent atoms to form a polymer. Uniformity on the molecular level can be attained by accelerating ester polymerization under heating and using the structural array of the polymer.

Therefore, the complex polymerization method is very effective where capability of the system depends on crystal structure such as in cathode materials for a battery and is also advantageous for industrial production.

In the complex polymerization, lithium nitrate and manganese nitrate are preferably used as raw materials, ethylene glycol is preferably used as the solvent and a carboxylic acid is preferably used as the complex forming agent. The lithium and manganese materials may also be in the form of an acetate, sulfate, carbonate or other salt. The carboxylic acid for use herein includes DL-malic acid, citric acid, malonic acid, tartaric acid and succinic acid. The organic solvent for use in the complex polymerization includes diethylene glycol and triethylene glycol in addition to ethylene glycol.

The addition amount of the complex forming agent based on the lithium and manganese materials may substantially correspond to the complex reaction equivalent with Li+Mn. The lithium and manganese metal ion concentrations each is suitably from 0.01 to 1 mol/dm$^3$, preferably from 0.05 to 0.2 mol/dm$^3$, and the weight ratio of water to the organic solvent is suitably from 0:100 to 30:70, preferably from 5:95 to 10:90.

A mixture of the materials thus prepared is reacted at from 100 to 180° C., preferably from 140 to 160° C. for from 2 to 24 hours, preferably from 5 to 10 hours. After concentrating, the mixture is subjected to thermal decomposition at a temperature of from 350 to 600° C., preferably from 400 to 500° C., to produce a precursor as the pretreated material. The thus-produced pretreated material (precursor) is pulverized, formed into pellets and burnt.

In the burning step, the pretreated material formed into pellets is burnt by heating in a heating apparatus such as an electric furnace at a temperature needed to produce $LiMnO_2$. This heat treatment may be performed in air at a temperature of from 850 to 1,050° C., preferably from 900 to 970° C., for from 1 to 50 hours, preferably from 3 to 24 hours. By burning, $LiMnO_2$ crystallization proceeds to form a layered rock-salt structure compound. When the burning temperature is lower than 850° C., a spinel structure compound is obtained. Furthermore, when the burning temperature exceeds 970° C., a spinel structure compound is produced, however, a layered rock-salt structure compound is also produced. When purity is not a concern, the burning may be carried out at a temperature higher than 970° C.

The burnt material containing $LiMnO_2$ is then quenched. As a result, a lithiated manganese oxide containing a layered rock-salt structure $LiMnO_2$ compound is obtained. If the burnt material is spontaneously cooled or gradually cooled in air, the crystal structure of the $LiMnO_2$ produced by burning is changed, and a spinel or other structure compound is obtained. Accordingly, the cooling time at this stage is important. The burnt material is preferably cooled to a temperature of 100° C. or lower within 10 seconds, and is more preferably cooled to room temperature or lower within 10 seconds. To achieve this cooling time, cooling with liquid nitrogen is preferred.

The thus-produced lithiated manganese oxide is an oxide containing $LiMnO_2$ which is a layered rock-salt structure compound, and is suitably used as a cathode material for lithium batteries, particularly secondary batteries, but the oxide may also be used for other applications.

The lithium secondary battery using the lithiated manganese oxide produced above as a cathode material undertakes the insertion reaction represented by the following formula (1), and has a higher electromotive force and energy density than a battery employing a spinel compound ($LiMn_2O_4$) where the insertion reaction takes place as shown in formula (2):

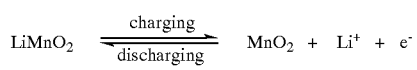
(1)

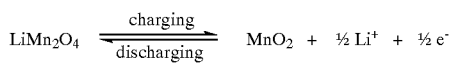
(2)

According to the present invention, lithium and manganese materials or pretreated materials thereof are burnt at a temperature need to produce producing $LiMnO_2$, and the burnt materials are then quenched. Accordingly, a lithiated manganese oxide containing a layered rock-salt structure compound in a semi-stable phase can be efficiently obtained by burning in air using simple operations.

Preferred embodiments of the present invention are described below.

Solid Reaction Method

Lithium carbonate and manganese carbonate are weighed to an atomic ratio (Li:Mn) of 1:1 and mixed in a pulverized state. The mixture is heat-treated in air in an electric furnace at a temperature of from 600 to 850° C. for from 2 to 5 hours to effect a solid phase reaction. After heat treating, the reaction product is pulverized, formed into pellets and burnt at a temperature of from 900 to 1,050° C. for from 3 to 24 hours. After burning, the pellets are quenched by placing them in liquid nitrogen to produce a lithiated manganese oxide.

Complex Polymerization Method

Lithium nitrate and manganese nitrate are mixed in an atomic ratio (Li:Mn) of 1:1, carboxylic acid is added thereto in an equimolar amount, and the mixture is dissolved in water. To the resulting solution, ethylene glycol is added to adjust the lithium and manganese ion concentrations each to be from 0.01 to 1 mol/dm³. At this time, the mixing ratio by weight of water to ethylene glycol is from 5:95 to 30:70.

The thus-prepared stock solution is reacted under reflux at a temperature of from 140 to 160° C. for from 2 to 24 hours to obtain a brown homogeneous solution. This brown solution is heated at 200° C. or higher and concentrated until the ethylene glycol is thoroughly removed. The concentrate is thermally decomposed at 350° C. in an electric furnace to obtain a precursor material. The thermal decomposition temperature is from 350 to 600° C. Thereafter, the precursor material is formed into pellets and heat-treated in air at a temperature of from 850 to 1,050° C. for from 2 to 24 hours. After burning, the pellets are quenched with liquid nitrogen to produce a lithiated manganese oxide.

According to the complex polymerization method, as shown in the following formula (3), when lithium and manganese ions dispersed in ethylene glycol are heated at a temperature close to the boiling point, the lithium and manganese ions form a coordinate structure complex together with the carboxylic acid (citric acid). When the temperature is further elevated, as shown in formula (4), the carboxylic acid is ester-condensed with the hydroxyl group of the ethylene glycol along with the evaporation of ethylene glycol. As a result, a high molecular polymer is produced. By subjecting this polymer to thermal decomposition, a precursor can be obtained.

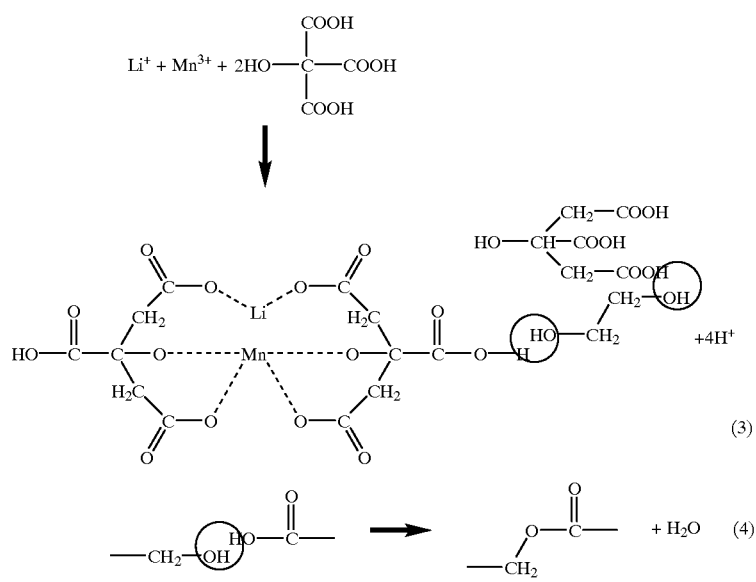

EXAMPLES

The invention is described in greater detail below by reference to the following Examples which, however, should not be construed as limiting the invention. In the Examples, the battery test was performed as follows.

Cathode

The cathode used in the battery test was prepared as follows.

An electroactive material, electroconductive acetylene black and polytetrafluoroethylene (PTFE) as a binder were mixed at a weight ratio of 85:10:5.

The preparation method is described below.

1) An electroactive material (0.5 g) and acetylene black (0.06 g) were mixed in a mortar;
2) PTFE (0.03 g) was added thereto and mixed; and
3) the resulting rubbery material was uniformly coated into a Ti mesh (15 mm×20 mm, manufactured by Katsurada Grating) on a glass plate.

Battery

FIG. 1 shows the structure of a secondary battery used in the charging and discharging test. The battery had the following structure. Teflon sheet 2 prevents short circuits between the battery armor plate 1 and the electrode. Teflon film 3 prevents leakage of the electrolytic solution. Separator 6 inhibits short circuits between the lithium metal 10 and the cathode 5. The parts from the cathode to the anode are press-bonded by the stainless steel spring 12 on the anode side. The procedure for preparing the battery is described below.

1) A Teflon sheet 2 was placed on a stainless steel armor plate 1 and thereon, a Teflon film 3 and a stainless steel plate 4 for removing the electrode were disposed in this order.
2) A cathode electroactive material 5 was placed on the center portion of the stainless steel plate 4 and impregnated with an electrolytic solution. The electrolytic solution used herein was a lithium paste (PD9, produced by Tomiyama Yakuhin Kogyo KK, 1 mol/dm$^3$, LiClO$_4$-propylene carbonate (PC)/dimethoxyethane (DME) (50:50 vol %)).
3) A separator 6 was placed on the cathode 5, and a Teflon film 7 was further placed on the separator 6. The separator used herein was a polypropylene sheet (CELLGUARD, produced by Hoechst Japan);
4) After disposing a Teflon plate 8, a glass filter 9 was placed thereon and an electrolytic solution was added again.
5) A Teflon film 13 was disposed and lithium metal 10 as an anode was placed on the glass filter 9. A lithium sheet (produced by Kyokuto Kinzoku Kogyo KK, 20 mm×15 mm×0.1 mm) having almost the same size as the cathode was used as the anode.
6) On the lithium metal 10, a stainless steel plate 11 and a stainless steel spring 12 were placed.
7) A Teflon film 13 was placed on the stainless steel spring 12, and a stainless steel plate 14 for removing the electrode was placed thereon.
8) Lastly, a Teflon film 15, a Teflon sheet 16 and a stainless steel armor plate 17 were placed thereon and the screws 18 were secured.

These operations were performed in a glove box in an argon atmosphere. The battery was left standing for 12 hours or more after assembling the cell (50×50×25 mm) so that the inside of the battery could stabilize. The battery thus prepared was then subjected to a charging and discharging test.

Battery Characteristics

The assembled secondary battery was charged and discharged in the range of from 2.0 to 4.5 V at various current densities (from 0.1 to 0.5 mA/cm$^2$) using a charging and discharging apparatus (H201B, manufactured by Hokuto Denko). These operations were carried out to evaluate the charge and discharge capacities, cycle performance and lithium ion insertion reaction process of the lithium secondary battery. The range of the measurement voltage was determined based on a voltage curve obtained by charging and discharging while taking into account the ionization potential of the electrolytic solution. The measurement was conducted at atmospheric pressure at 25° C. After completing the respective cycles, the battery was allowed to stand idle for 3 hours so as to stabilize the inside of the battery.

Example 1 (solid reaction method)

Lithium carbonate and manganese carbonate were weighed to an atomic ratio (Li:Mn) of 1:1 and thoroughly mixed in a mortar. The mixture was reacted by heat-treating in an electric furnace at 700° C. for 3 hours.

After heat treating, the reaction product was pulverized, formed into pellets and burnt at a temperature of from 900 to 1,050° C. for 10 hours or more. After burning, the pellets were placed in liquid nitrogen and quenched to 20° C. or lower within a cooling time of 10 seconds to produce a lithiated manganese oxide.

Comparative Example 1

A test was performed in the same manner as in Example 1 except that the burning temperature was 800° C.

Figure 2A:
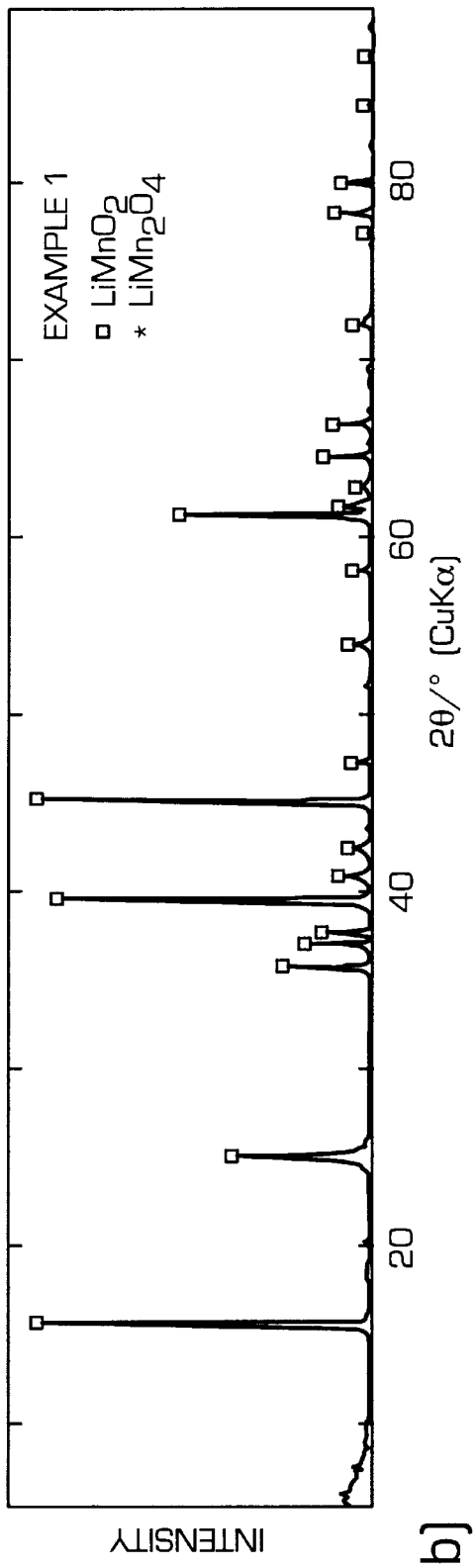
FIGS. 2(a) and 2(b) are views showing X-ray diffraction patterns obtained in Example 1 and Comparative Example 1, respectively.
Figure 2B:
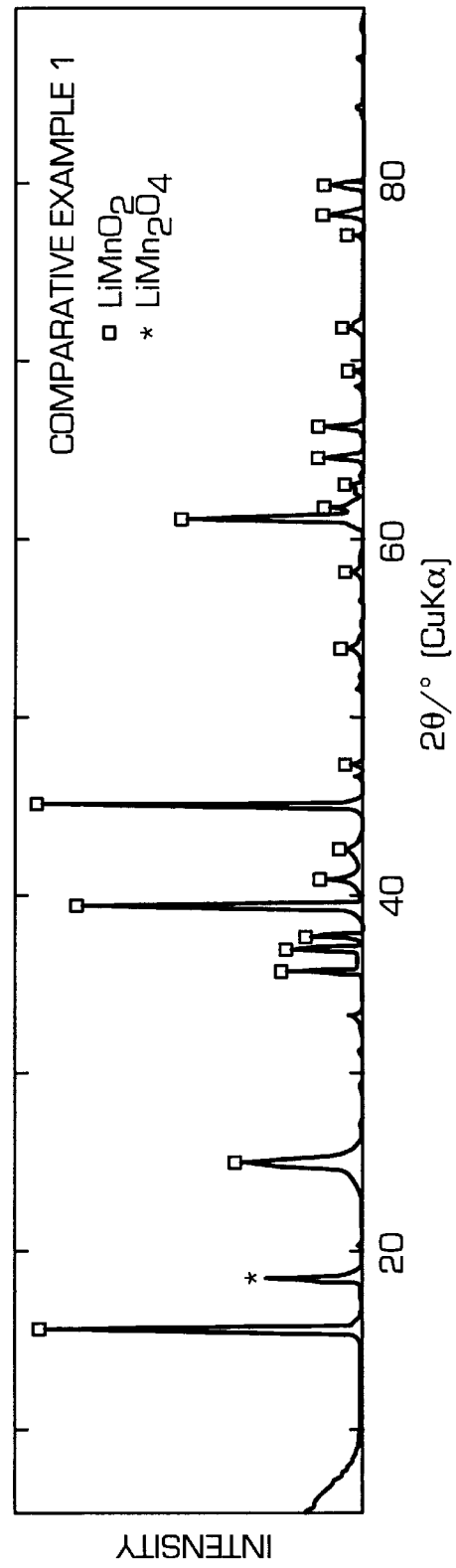

FIGS. 2(a) and 2(b) show X-ray diffraction patterns of lithiated manganese oxides obtained in Examples 1 and Comparative Example 1, respectively.

It is seen from FIG. 2(a) that in Example 1, a lithiated manganese oxide LiMnO$_2$ with a ratio of Li:Mn (atomic ratio) of 1:1 alone was produced. On the other hand, in Comparative Example 1, impurities such as LiMn$_2$O$_4$ were present in addition to LiMnO$_2$, as seen from FIG. 2(b).

Comparative Examples 2 and 3

Following the procedure of Example 1, spontaneous cooling (cooling to 20° C. or lower within a cooling time of about 1 hour—Comparative Example 2) or cooling with water (cooling to 20° C. or lower within a cooling time of about 2 minutes—Comparative Example 3) was performed after burning, and the products were identified by X-ray diffraction.

From the results of the X-ray diffraction, the products thus obtained were found to be a mixture of LiMnO$_2$ and LiMn$_2$O$_4$.

Example 2 (complex polymerization method)

Lithium nitrate and manganese nitrate were mixed in an atomic ratio (Li:Mn) of 1:1, citric acid or malic acid as a carboxylic acid was added thereto in an equimolar amount, and the mixture was dissolved in water. The resulting solution was adjusted to a concentration of from 0.01 to 1 mol/dm$^3$ by adding thereto ethylene glycol. At this time, the mixing ratio of water and ethylene glycol was 10:90 in terms of a weight ratio.

The resulting stock solution adjusted to the above-described concentration was reacted under reflux at atmospheric pressure and at a temperature of at from 140 to 160°

C. for 6 hours. As a result, a brown homogeneous solution was obtained. This brown solution was heated at 200° C. or higher using a hot stirrer and concentrated until the ethylene glycol was thoroughly removed. The concentrate was thermally decomposed at 350° C. in an electric furnace to obtain a precursor material. Thereafter, the precursor material was formed into pellets (10 mm×3 mm) and burnt in air at a temperature of from 700 to 1,050° C. for from 3 to 24 hours. After burning, the pellets were placed in liquid nitrogen and quenched to 20° C. or lower within a cooling time of 10 seconds to produce a lithiated manganese oxide.

Comparative Example 4

A test was performed in the same manner as in Example 2, except that the burning temperature was 800° C.

Figure 3:
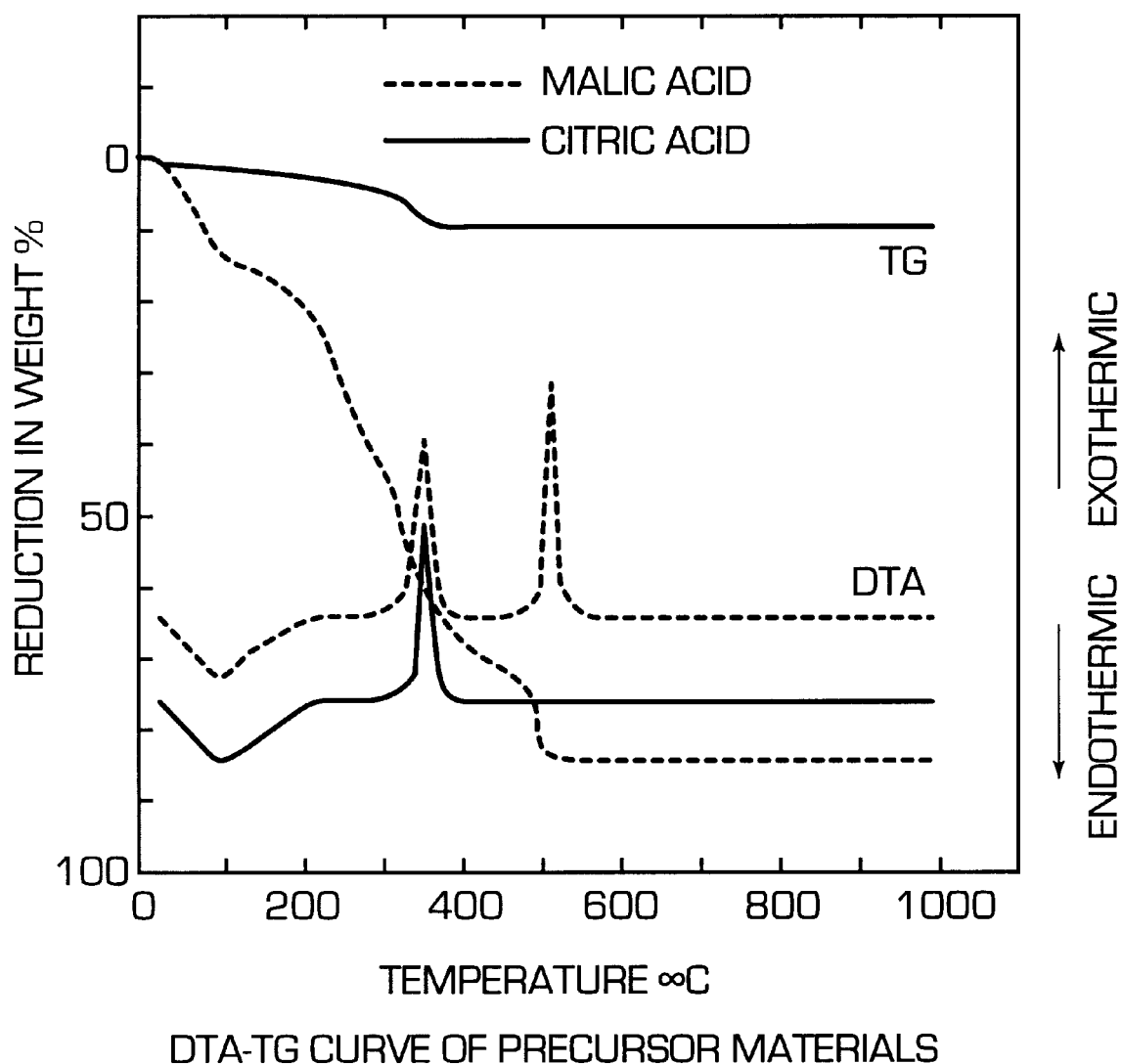
FIG. 3 is a view showing DTA-TG curves of lithiated manganese oxide precursors as used in Example 2 and Comparative Example 4.

FIG. 3 shows DTA-TG curves of the lithiated manganese oxide precursors synthesized by the complex polymerization method as used in Example 2 and Comparative Example 4.

It is seen from FIG. 3 that in the DTA (differential thermal analysis) curve, an endothermic peak was present between room temperature and 200° C. and an exothermic peak was present between 200° C. and 500° C. Since a reduction in weight occurs at these peaks in the TG (thermogravimetric analysis) curve, the endothermic peak can be ascribed to decomposition of binder water in the precursor, and the exothermic peak can be ascribed to decomposition and combustion of organic material in the precursor. This organic material is considered to be coordinated carboxylic acid, ethylene glycol and the like.

Figure 4:
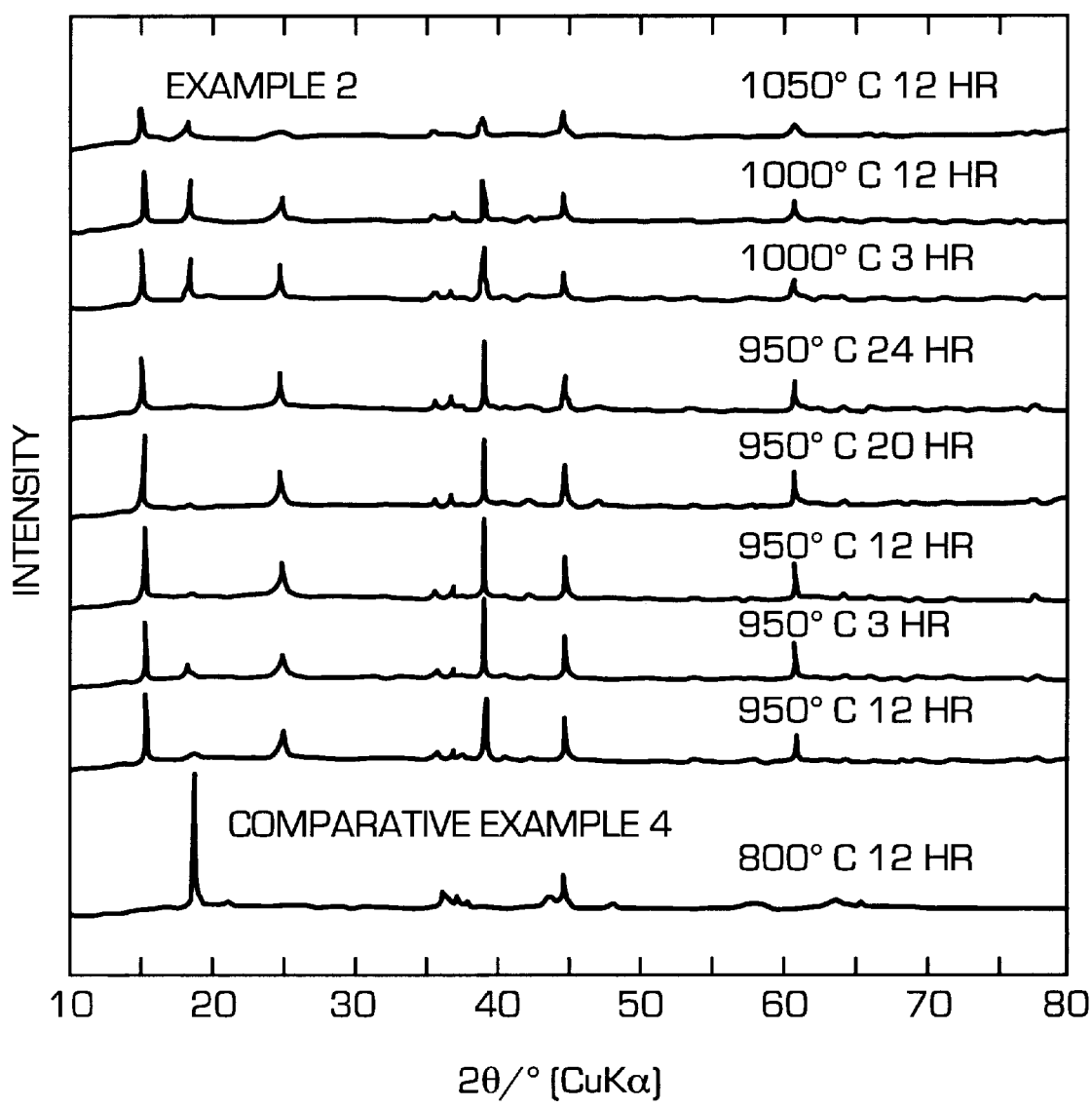
FIG. 4 is a view showing X-ray diffraction patterns obtained in Example 2 and Comparative Example 4.

FIG. 4 shows X-ray diffraction patterns of the lithiated manganese oxides obtained in Example 2 and Comparative Example 4.

It is seen from FIG. 4 that a spinel structure $LiMn_2O_4$ was produced at a burning temperature of 800° C. (Comparative Example 4). On the other hand, a layered rock-salt structure $LiMnO_2$ was produced at a burning temperature of 900° C. or higher, and both $LiMnO_2$ and $LiMn_2O_4$ were produced at a burning temperature of 1,000° C. or higher. Furthermore, when the heat treatment was carried out at 950° C., single phase $LiMnO_2$ was obtained. However, when the heat-treatment time was short, $LiMn_2O_4$ was produced in addition to $LiMnO_2$. Therefore, the heat treatment is preferably carried out for 20 hours or more.

Comparative Examples 5 and 6

In Example 2, spontaneous cooling (cooling to 20° C. or lower within a cooling time of about 1 hour—Comparative Example 5) or cooling with water (cooling to 20° C. or lower within a cooling time of about 2 minutes—Comparative Example 6) was performed after burning, and the products were identified by X-ray diffraction.

Figure 5:
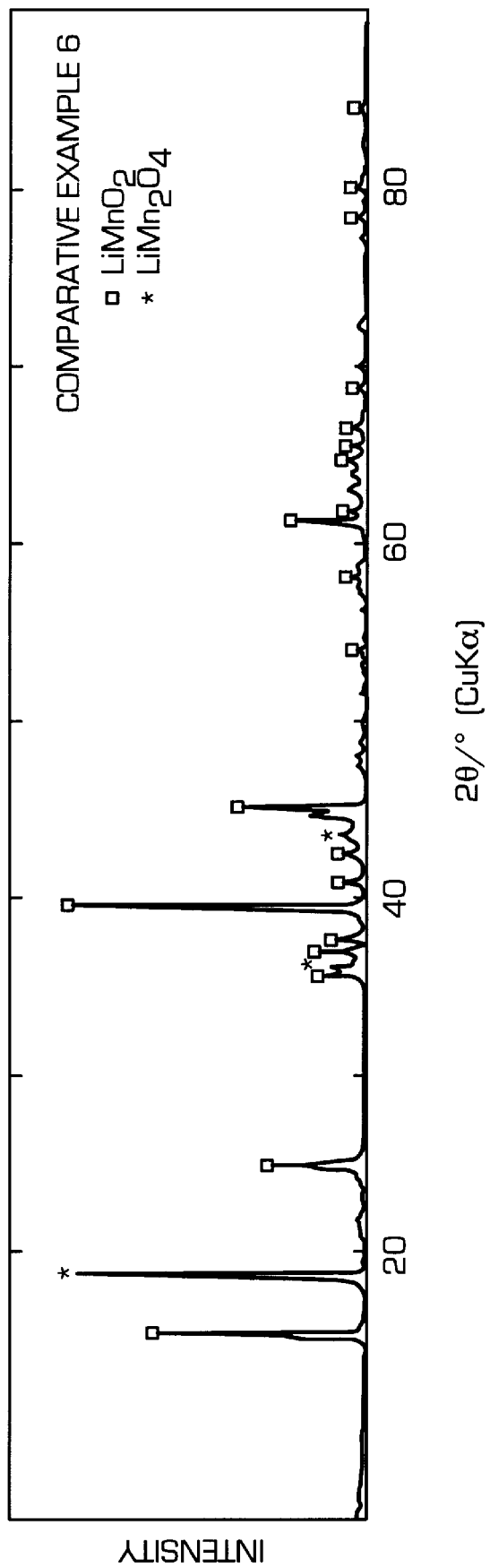
FIG. 5 is a view showing an X-ray diffraction pattern obtained in Comparative Example 6.

FIG. 5 shows an X-ray diffraction pattern in the case of cooling with water in Comparative Example 6. As seen from FIG. 5, the product thus obtained was a mixture of $LiMnO_2$ and $LiMn_2O_4$. Almost the same results were obtained in Comparative Example 5 where spontaneous cooling was performed.

Reference Example 1

Following the procedure of Examples 1 and 2, the Li:Mn atomic ratio was set to 1:2, and the pellets thus obtained were burnt and then allowed to spontaneously cool to produce $LiMn_2O_4$.

Figure 6:
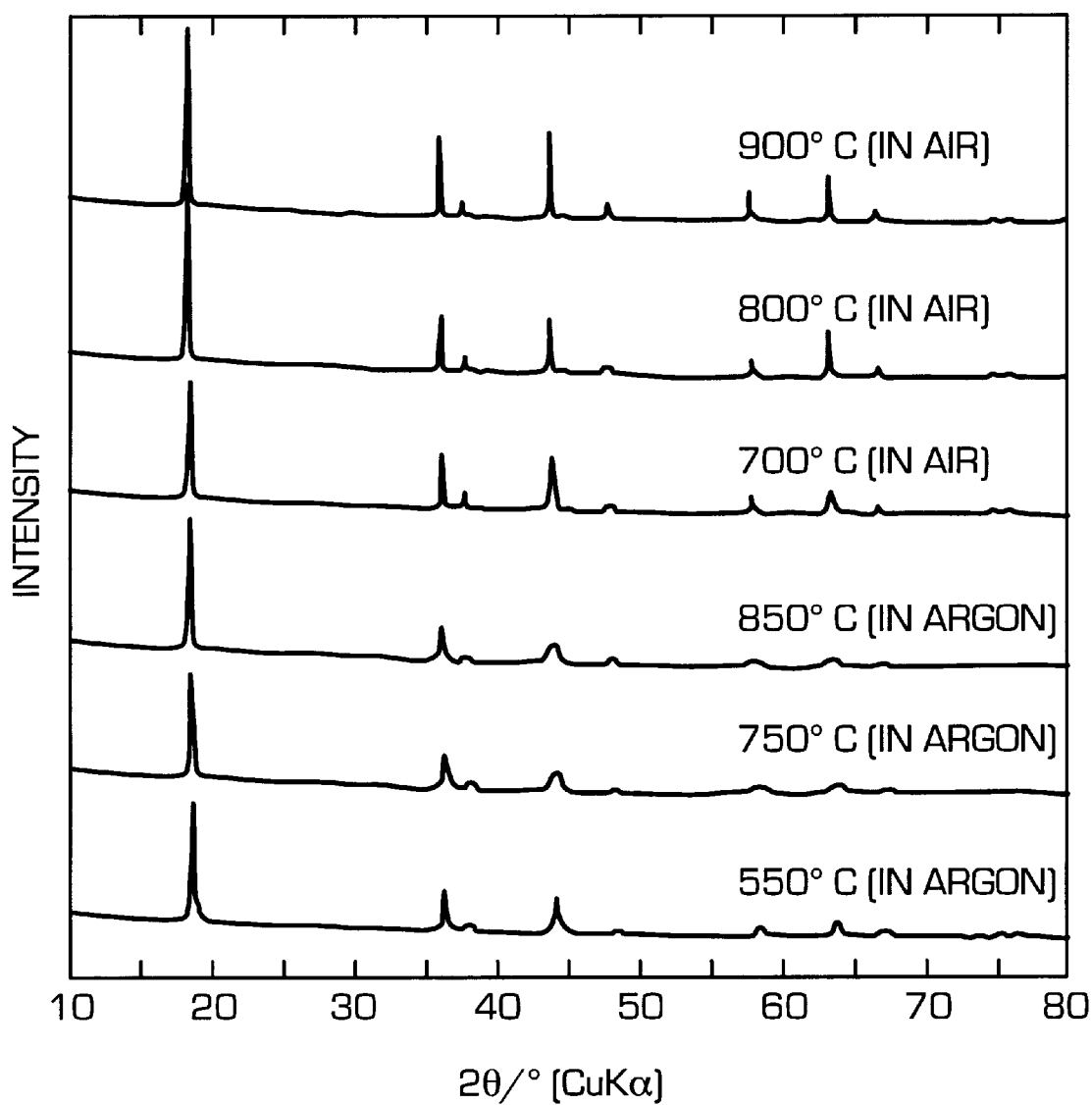
FIG. 6 is a view showing X-ray diffraction patterns obtained in Reference Example 1.

FIG. 6 shows the X-ray diffraction patterns of the resulting products. It is seen from FIG. 6 that a spinel structure $LiMn_2O_4$ was produced both in air and in argon.

The lattice constant of each product as determined from the powder X-ray diffraction patterns of the Examples and Comparative Examples is shown in Table 1. These results show that in the case of $LiMn_2O_4$, the lattice constants were considerably greater than the theoretical value (JCPDS card). This reveals that the $LiMn_2O_4$ thus obtained had a large crystal lattice and was an oxygen defective crystal. On the other hand, the lattice constants of $LiMnO_2$ well coincided with the theoretical value.

TABLE 1

Lattice Constants of Lithiated Manganese Oxides

| | Lattice Constant (Å) | |
|---|---|---|
| | a | c |
| $LiMnO_2$ (rhombic phase) | | |
| JCPDS card | 4.5756 | 2.8052 |
| Solid phase reaction method | 4.5532 | 2.7822 |
| Complex polymerization method | 4.5655 | 2.7980 |
| $LiMn_2O_4$ (rhombic phase) | | |
| JCPDS card | — | 8.2476 |
| Solid phase reaction method | — | 8.3054 |
| Complex polymerization method | — | 8.3118 |

Figure 7:
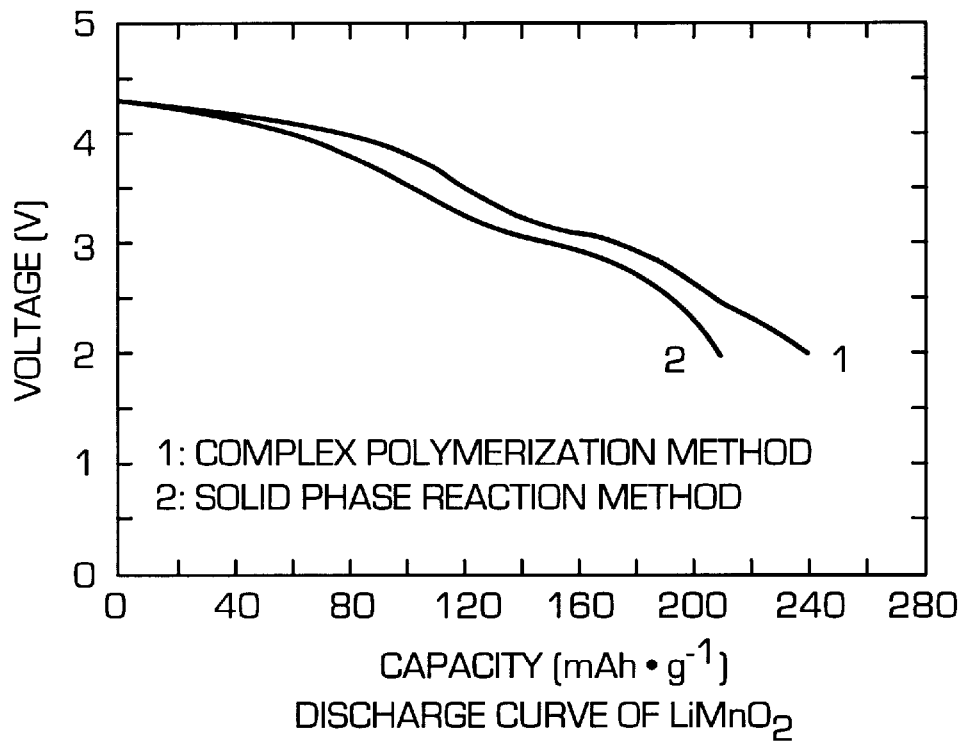
FIG. 7 is a view showing discharge curves of $LiMnO_2$.
Figure 8:
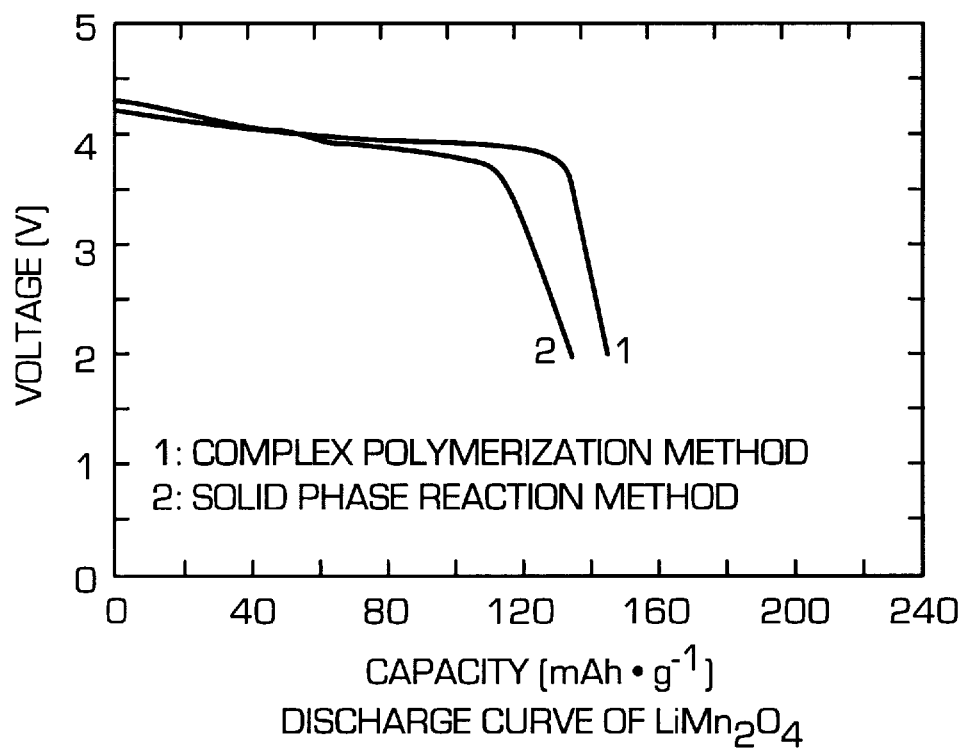
FIG. 8 is a view showing discharge curves of $LiMn_2O_4$.

FIG. 7 and FIG. 8 show the discharge curves of $LiMnO_2$ and $LiMn_2O_4$, respectively, as synthesized under optimal heat treatment conditions in the Examples and Reference Example. These results show that in the case of $LiMnO_2$, two plateaus were present at both 4V and 3V due to an unstable crystal structure during charging and discharging. The discharge capacities were 240 mAh/g (complex polymerization method) and 210 mAh/g (solid phase reaction method) when discharged at 2V.

On the other hand, in the case of $LiMn_2O_4$, the electric capacity was close to the theoretical capacity and one plateau region was present. This is because the crystal structure during the insertion reaction is stable. The charging and discharging capacities were 145 mAh/g (complex polymerization method) and 130 mAh/g (solid phase reaction method). In either case, it is seen that the discharge capacity was larger when the oxide was synthesized by the complex polymerization method.

Figure 9:
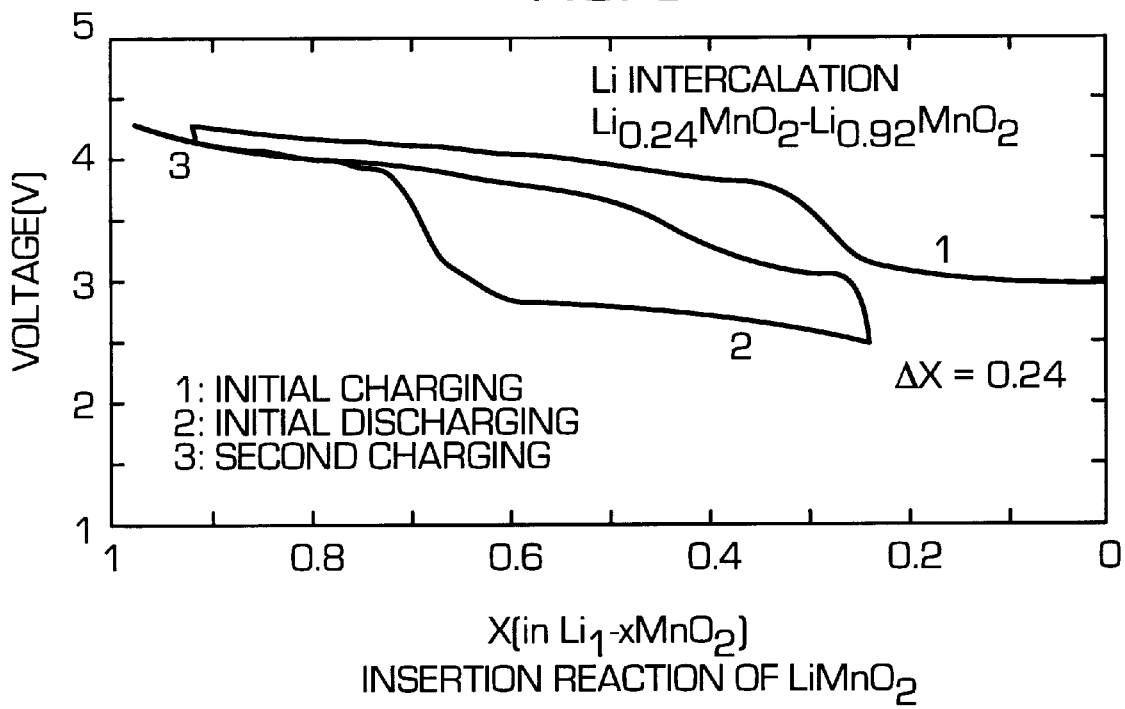
FIG. 9 is an insertion reaction diagram of $LiMnO_2$.
Figure 10:
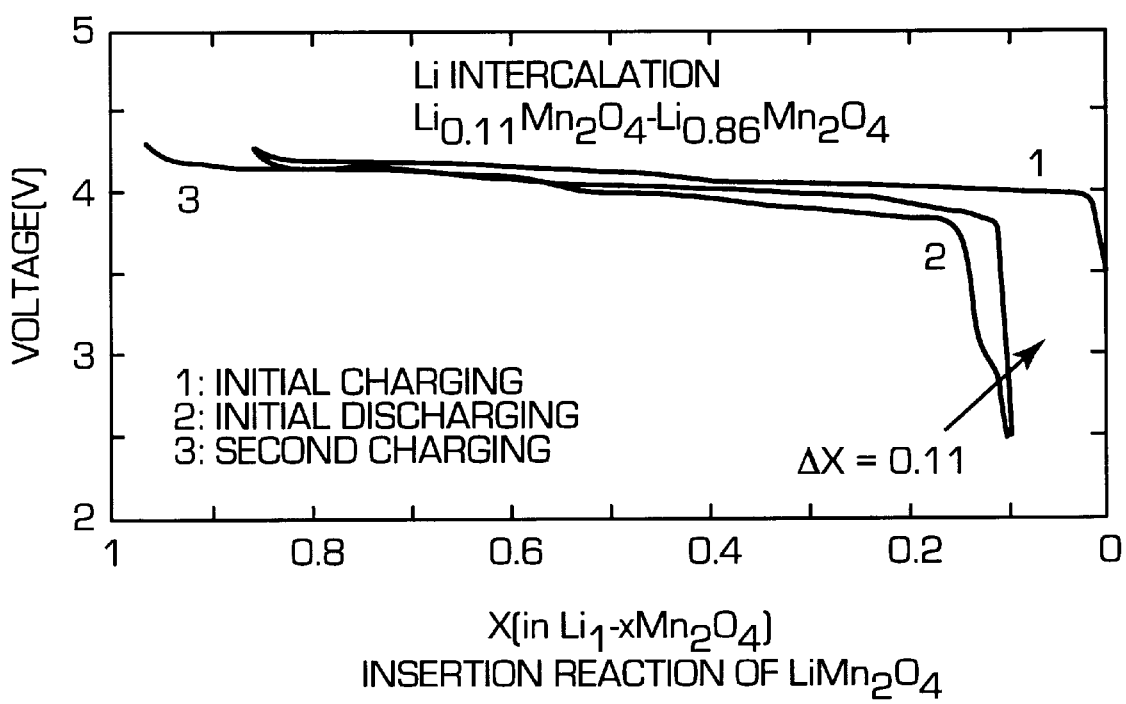
FIG. 10 is an insertion reaction diagram of $LiMn_2O_4$.

FIG. 9 and FIG. 10 are insertion reaction diagrams showing the behavior of Li ion during the insertion reaction in the above-described charging and discharging operations for $LiMnO_2$ and $LiMn_2O_4$, respectively. The batteries had an irreversible capacity ($\Delta X$) of 0.22 and 0.11, respectively.

While the invention has been described in detail and with reference to specific embodiments thereof, it will be apparent to one skilled in the art that various changes and modifications can be made therein without departing from the spirit and scope thereof.

What is claimed is:

1. A process for producing lithiated manganese oxide, which comprises burning lithium and manganese materials or pretreated lithium and manganese materials at a temperature sufficient to synthesize $LiMnO_2$, and then quenching the burnt material to a temperature of 100° C. or lower in less than 10 seconds:

wherein the pretreated lithium and manganese materials comprise:
   a heat-treated material prepared by reacting a solid phase mixture of lithium and manganese materials by heat treating, or a precursor prepared by a complex polymerization method comprising reacting lithium and manganese materials, a complex forming agent, and a solvent.

2. The process as claimed in claim 1, wherein said lithiated manganese oxide contains a layered rock-salt structure $LiMnO_2$ compound.

3. The process as claimed in claim 1, which comprises quenching in liquid nitrogen.

4. The process as claimed in claim 2, which comprises quenching in liquid nitrogen.

5. The process as claimed in claim 1, wherein said lithium material is selected from the group consisting of a nitrate, an oxide, a hydroxide, an acetate, a carbonate, a sulfate and a manganate of lithium, and said manganese material is selected from the group consisting of a nitrate, an oxide, a hydroxide, an acetate, a carbonate and a sulfate of manganese.

6. The process as claimed in claim 1, which comprises mixing the lithium and manganese materials in an atomic ratio Li:Mn of from 1:0.5–1.5.

7. The process as claimed in claim 1, which comprises burning at a temperature of from 850 to 1,050° C.

8. The process as claimed in claim 1, which comprises burning at a temperature of from 900 to 970° C.

9. A process for producing lithiated manganese oxide, which comprises preparing a mixture of lithium and manganese materials, a solvent, and a complex forming agent; reacting the mixture thus prepared at a temperature of 100 to 180° C.; concentrating the reaction mixture and thermally decomposing the concentrate at a temperature of 350 to 600° C. to obtain a pretreated material; burning the pretreated material at a temperature of 850 to 1,050° C. for 1 to 50 hours; and quenching the burnt material to a temperature of 100° C. or lower in less than 10 seconds.

10. The process as claimed in claim 9, wherein the lithium material comprises lithium nitrate, the manganese material comprises manganese nitrate, the solvent is selected from the group consisting of ethylene glycol, diethylene glycol and triethylene glycol, and the complex forming agent comprises a carboxylic acid.

11. The process as claimed in claim 9, wherein said lithium material is selected from the group consisting of a nitrate, an acetate, a carbonate and a sulfate of lithium, and said manganese material is selected from the group consisting of a nitrate, an acetate, a carbonate and a sulfate of manganese.

12. The process as claimed in claim 9, which comprises quenching in liquid nitrogen.

13. The process as claimed in claim 9, which comprises pulverizing and pelletizing the pretreated material prior to burning.

14. A process for producing lithiated manganese oxide $LiMnO_2$, which comprises reacting a mixture of lithium and manganese materials in solid phase by heat treating at a temperature of 600 to 850° C. to produce a pretreated material; burning the pretreated material at a temperature of 850 to 1,050° C. for 1 to 50 hours; and quenching the burnt material to a temperature of 100° C. or lower in less than 10 seconds.

15. The process as claimed in claim 14, which comprises reacting a mixture of a lithium material selected from the group consisting of a nitrate, an oxide, a hydroxide, an acetate, a carbonate, a sulfate and a manganate of lithium and a manganese material selected from the group consisting of a nitrate, an oxide, a hydroxide, an acetate, a carbonate and a sulfate of manganese.

16. The process as claimed in claim 14, which comprises pulverizing the lithium and manganese materials prior to reacting in solid phase, and pulverizing and pelletizing the pretreated material prior to burning.

* * * * *